Patented June 29, 1937

2,085,706

UNITED STATES PATENT OFFICE 2,085,706

DERIVATIVES OF CARBOXYLIC ACID AMIDES

Conrad Schoeller and Max Wittwer, Ludwigshafen-on-the-Rhine, Germany, assignors to I. G. Farbenindustrie Aktiengesellschaft, Frankfort-on-the-Main, Germany, a corporation of Germany No Drawing. Application August 18, 1934, Serial No. 740,534. In Germany November 29, 1930

7 Claims. (Cl. 260—124)

The present invention relates to assistants for the textile and related industries and a process of producing same. This application is a continuation-in-part of application Ser. No. 577,148 filed on November 24, 1931.

We have found that valuable products are obtained by introducing into an organic acid amide containing at least 1 hydrogen atom attached to an amido nitrogen atom "polyglycol" radicles having at least 4 ethenoxy (-O-$C_2H_4$-) groups, as for example the tetra-ethylene glycol radicle:

-$OCH_2$-$CH_2OCH_2$-$CH_2OCH_2$-$CH_2OCH_2$-$CH_2OH$, any free hydroxyl group still present being neutralized with reactive compounds, if desired, as for example with carboxylic acids, polybasic mineral acids, such as sulphuric acid or phosphoric acid, acid halides, halogen alkyl or halogen aryl or halogen aralkyl sulphonic acids (as for example chlorethane sulphonic acid and 4-chlormethyl-benzene-1-sulphonic acid) or sulphuric acid esters (such as dimethyl sulphate) or aldehydes. Aliphatic, cycloaliphatic, aliphatic-aromatic and aromatic carboxylic acid amides containing at least 1 hydrogen atom attached to an amido nitrogen atom and which may contain substituents, such as halogen atoms, hydroxyl, carbonyl, ester, ether, nitro or sulphonic acid groups are suitable initial materials for the present process. Urethanes, urea and its derivatives, amides of aromatic carboxylic acids such as alpha-naphthoic acid hydroxyethyl amide may be used as well as the amides of the following acids: aliphatic carboxylic acids insoluble in water, such as those containing at least 6 carbon atoms and especially the saturated, unsaturated and/or hydroxylated carboxylic acids of vegetal, i. e. animal and vegetable, origin and other mono- or polycarboxylic acids containing from 6 to say 30 carbon atoms (preferably from 12 to 18 carbon atoms) as for example caproic acid, lauric acid, oleic acid, ricinoleic acid, linoleic acid, palmitic acid, stearic acid, hydroxystearic acid, the acids from beeswax, montanic acid and naphthenic acids and synthetic acid mixtures obtainable by the destructive oxidation of paraffin wax or paraffin oil or like non-aromatic high molecular hydrocarbons and fractions of such oxidation products (as for example the hydroxy carboxylic acid fraction insoluble in petroleum ether).

Water-insoluble amides can be rendered more useful by the conversion according to the present invention so far as they contain a reactive hydrogen atom connected either to nitrogen or to oxygen; these amides are preferably chosen from those of fatty acids containing at least 6 carbon atoms and advantageously from those of the beforementioned acids of vegetal origin. The water-insoluble amides may be chosen from those prepared from ammonia or water-soluble primary amines and from alkylol amines, as for example those of mono-, di- or tri- ethanol or -propanol amines or of mixtures thereof.

The long chain polyglycol radicles may be added on to the initial materials defined above by treatment with corresponding quantities of ethylene oxide or substances forming the same, such as alkylene halogenhydrins, if desired, with the employment of condensation catalysts, such as surface active substances as for example bleaching earths or active charcoal, strongly acid substances as for example sulphuric or phosphoric acids or sodium or potassium bisulphates, or also strongly alkaline agents such as caustic soda or alkali metal alcoholates and/or with the employment of increased pressure, if desired, at elevated temperatures such as from about 80° to 200° C, preferably between 100° and 150° C, whereby the ethylene oxide molecules arrange themselves with the formation of long chain polyglycols. Depending on the amount of ethylene oxide employed it is possible to add on four or more -$C_2H_4$- groups to each other by means of ether linkages. On the other hand the at least quadruple polyglycol ethers may be first formed in known manner and then condensed in known manner with the amides. If desired, mono-alkyl or -aryl ethers or esters of the at least quadruple polyglycol ethers may be employed for this step so that a further conversion of the products with acids, acid halides, alkyl or aryl halides or polybasic mineral acids described above may be dispensed with. The quantities of the polyglycol forming agents e. g. of ethylene oxide, or of an equivalent compound such as the glycol chlorhydrins, generally correspond to from one half molecular proportion of polyglycol forming agent per carbon atom of the amide, the quantity of polyglycol forming agent being, however, at least 4 molecular proportions of the amide even if the latter should contain less than 8 carbon atoms so that products with at least quadruple polyglycol radicles are formed. In most cases, however, from 4 or 6 to 20 or 30 and even up to 50 molecular proportions of the polyglycol forming agent are employed per molecular proportion of amide or the corresponding polyglycols themselves. By employing amides containing several reactive hydrogen atoms such as acid amides containing 2 nitrogen atoms attached to the amido nitrogen, and furthermore amides of hydroxy carboxylic acids, for example hydroxy stearic acid, dicarboxylic acids such as sebacic or pimelic acids products may be obtained containing not only one but several, at least quadruple, polyglycol radicles in the molecule.

The products obtainable by adding the polyglycol radicles on to carboxylic acid amides containing at least two reactive groups usually contain one or two free hydroxyl groups at the end of the chains and these may be converted as mentioned with reactive compounds. As such reactive compounds may be mentioned in particular acids which react to form esters, as for example sulphuric, chlorsulphonic, phosphoric, phthalic or fatty acids for example with from 8 to 18 carbon atoms and their derivatives, such as chlorides, or halogenated paraffin wax. Such products as contain a halogen at the end of the polyglycol ether chain as for example those prepared with ethylene oxide and halogen hydrins, or, those prepared by substituting the hydroxyl group at the end of the chain by iodine or bromine according to the usual methods, may be brought into reaction with basic compounds, such as amines, acid amides, compounds containing hydroxyl groups and the like may be brought into reaction therewith.

The products obtained have especially valuable properties. They are capable of dissolving or dispersing in water and have in many cases excellent wetting, foaming and cleansing power so that they may find a wide field of employment for example in the textile, leather, paper, wax and polish industries, as for example in carbonizing, mercerizing, dressing, bucking, washing, finishing, dyeing, printing or polishing. In dyeing and printing they exert an excellent levelling action. For example in dyeing with vat dyestuffs, or with azo dyestuffs from β-naphthoic acid arylides on the fibre, the dyeings are rendered uniform or, respectively, fast to rubbing. A special advantage of the said products consists in the fact that they are generally speaking practically neutral so that the fibres are in no way attacked. Moreover, the formation of insoluble calcium or magnesium compounds such as is frequently the case in hard water with soaps or Turkey red oils does not take place with these products.

The compounds containing the at least quadruple polyglycol radicles are also suitable as dispersing agents and solvents for example for vegetal, i. e. vegetable and animal, fats and oils, natural and artificial resins and waxes, organic dyestuffs and inorganic pigments such as carbon black, solid and liquid hydrocarbons, and they may also be advantageously used as softening agents, as for example for films, bands and lacquers prepared from cellulose esters and ethers or from artificial resins. Most of the said condensation products may also be advantageously employed in the cosmetic, pharmaceutical and foodstuff industries employing wetting or emulsifying agents, or in enzymatic processes for example in the degradation of proteins, such as glue, and carbohydrates, for example for degumming raw silk, or desizing, in which process the employment of the said condensation products containing sulphonic groups, is, however, not permitted. When the products containing polyglycol ether radicles of the said kind are viscous, they are suitable for the preparation of textile oils, lubricating oils and drilling oils. When insoluble compounds, such as azo dyestuffs, are prepared in the presence of the said products, the said insoluble compounds are much more finely divided than when produced in the absence of the said products.

For treatment of textiles in aqueous baths, such as dyeing, washing, scouring, stripping, vivifying or degumming, the amount of the said condensation products is usually from 0.05 to 10 grams per each litre of the bath.

For the production of pastes, creams, cosmetic preparations, emulsions or suspensions, the amount of the said condensation products may be from about 5 to about 1000 per cent or more, according to the nature of the substances treated and the required consistency of the final mixture.

The products according to the present invention may be used alone or together with other agents, such as alkali metal, ammonia or amine soaps or soap-like substances, for example sulphonic acids of high molecular aliphatic or aromatic hydrocarbons, which may contain hydroxy and/or carboxylic groups or sulphuric esters of high molecular alcohols, vegetal, i. e. vegetable and animal, oils and fats, natural and synthetic waxes or cellulose esters and ethers. For example preparations from the said products and soaps, Turkey red oils, sulphuric esters of alcohols, saponine, cellulose ethers, organic aliphatic or aromatic sulphonic acids, glue, vegetable mucilages, dextrin cellulose sulphite waste liquor and other colloids. In many cases it is advantageous to employ the products together with salts from inorganic or organic acids and bases such as common salt, Glauber's salt, magnesium sulphate, water-glass, phosphates, salts of methylamine, diethylamine, monoethanol amine, piperidine, pyridine, or together with organic solvents or bleaching agents, such as perborates. Aqueous solutions of Turkey red oils and of true organic sulphonic acids of high concentration may be prepared in a very satisfactory manner by means of the products obtainable according to the present invention.

The following examples will further illustrate how this invention may be carried out in practice but the invention is not restricted to these examples.

*Example 1*

7 molecular proportions of ethylene oxide are caused to react with 1 molecular proportion of coconut fatty acid amide under pressure at about 160° C. in the presence of 1 per cent of sodium ethyl alcoholate. A wax-like, water-soluble product of high wetting power is obtained which may be employed with advantage also in hard water. For example calcium soaps precipitated in baths for the treatment of textiles may be redissolved by the addition of the said product while warming to about 60° C. An aqueous solution of the product, if desired, together with solvents, is suitable for the use as a spot cleaning agent.

By the reaction of about 10 molecular proportions of ethylene oxide with naphthenic acid amide under pressure at about 150° C. with the addition of 0.2 per cent of caustic soda solution of 40° Bé. a condensation product is obtained which is applicable with advantage as a wetting agent in bucking textiles.

*Example 2*

About 20 molecular proportions of ethylene oxide are caused to react with 1 molecular proportion of ricinoleic acid hydroxyethylamide (obtainable by condensation of ricinoleic acid with monoethanolamine) under pressure at about 150° C. An excellent levelling and dispersing agent is thus obtained. If about 30 molecular proportions of ethylene oxide are reacted with 1 molecular proportion of oleic acid hydroxyethylamide in an analogous manner, a paste-like, readily water-soluble product is obtained which is an excellent protective colloid.

*Example 3*

1 molecular proportion of oleic sulphamide is reacted with 10 molecular proportions of ethyleneoxide under pressure from about 120 to 130° C. A brown oil is obtained which is distinguished by good cleansing properties. By treating 1 molecular proportion of the amide of sulphopalmitic acid with about 15 molecular proportions of ethylene oxide a condensation product is obtained which is a good protecting colloid.

*Example 4*

About 25 molecular proportions of ethylene oxide are caused to react under pressure at about 150° C. with 1 molecular proportion of the amide from stearic acid and phenylenediamine or with 1 molecular proportion of oleic acid anilide. Water-soluble condensation products of excellent protecting colloidal properties and levelling power are thus obtained.

Instead of the said amides mixtures of amides, such as are obtainable by heating coconut fat or beef tallow with triethylenetetramine or monoethanolamine or the like, may be employed. The products obtainable from these initial materials are eminently suitable for preventing the precipitation of calcium soaps in hard water. Soaps containing already products of the type described are very stable towards hard water.

*Example 5*

4 molecular proportions of ethylene oxide are caused to react with 1 molecular proportion of ricinoleic acid hydroxyethylamide under pressure at about 150° C. The condensation product obtained is sulphonated with the equivalent amount of chlorsulphonic acid while in ethereal solution. After removal of the hydrogen chloride formed and of the solvent by means of a dry current of air, the acid sulphuric ester of the condensation product is obtained. The said ester may be converted into neutral alkali metal (for example sodium) salts or amine salts; the latter have an excellent washing power, (for example in washing wool containing suint) and wetting power, for example when employed in concentrations of from 3 to 5 grams per liter of water.

If the said condensation product is esterified with oleic acid or lauric acid by heating the two components together, products are obtained which are very suitable for preparing ointments and creams.

What we claim is:—

1. The process of producing assistants for the textile and related industries which comprises condensing an organic carboxylic acid amide containing at least 6 carbon atoms and at least 1 hydrogen atom attached to an amido nitrogen atom with a polyglycol compound containing from 6 to 50 ethenoxy groups.

2. From readily to difficultly water-soluble etheneoxy-derivatives of carboxylic acid amides containing at least 6 carbon atoms, the said etheneoxy-derivatives containing the group $(-C_2H_4-O)_nX$ directly attached to an amido nitrogen atom, wherein X denotes a member of the class consisting of hydrogen and the alkyl, aryl and acyl groups, and $n$ denotes an integral number above 3.

3. The process of producing assistants for the textile and related industries which comprises condensing an organic carboxylic acid amide containing at least 6 carbon atoms and containing at least one hydrogen atom attached to an amido nitrogen atom with a polyglycol compound containing at least 4 ethenoxy groups.

4. The process of producing assistants for the textile and related industries which comprises condensing an organic carboxylic acid amide containing at least 6 carbon atoms and at least 1 hydrogen atom attached to an amido nitrogen atom with a compound capable of forming a polyglycol compound.

5. The process of producing assistants for the textile and related industries which comprises condensing 1 molecular proportion of an organic carboxylic acid amide containing at least 6 carbon atoms and at least 1 hydrogen atom attached to an amido nitrogen atom with at least four molecular proportions of ethylene oxide.

6. From readily to difficultly water-soluble etheneoxy-derivatives of carboxylic acid amides containing at least 6 carbon atoms, the said etheneoxy-derivatives containing directly attached to an amido nitrogen atom at least 1 polyglycol radicle with at least 4 ethenoxy groups, the said polyglycol radicle containing attached to the final oxygen atom a member selected from the class consisting of hydrogen and the alkyl, aryl, aralkyl and acyl groups.

7. From readily to difficultly water-soluble etheneoxy-derivatives of aliphatic carboxylic acid amides containing from 12 to 18 carbon atoms, the said etheneoxy-derivatives containing directly attached to an amido nitrogen atom the group $(-C_2H_4-O)_nX$ directly attached to an amido nitrogen atom, wherein X denotes a member of the class consisting of hydrogen and the alkyl, aryl, aralkyl and acyl groups, and $n$ denotes an integral number from 4 to 30.

CONRAD SCHOELLER.
MAX WITTWER.